United States Patent
Patel

(10) Patent No.: US 7,675,278 B2
(45) Date of Patent: Mar. 9, 2010

(54) POWER DISTRIBUTION CURRENT LIMITING SWITCH INCLUDING A CURRENT LIMIT BLANKING PERIOD PROVIDING A BURST OF CURRENT

(75) Inventor: Hardik D. Patel, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 60 days.

(21) Appl. No.: 11/864,440

(22) Filed: Sep. 28, 2007

(65) Prior Publication Data
US 2009/0085643 A1  Apr. 2, 2009

(51) Int. Cl.
G05F 1/00 (2006.01)
G05F 1/565 (2006.01)
H02M 1/00 (2007.01)

(52) U.S. Cl. .............. 323/274; 323/275; 323/908; 363/49

(58) Field of Classification Search ............ 323/222, 323/277, 282, 238, 273, 274, 275, 315, 901, 323/908; 363/49
See application file for complete search history.

(56) References Cited

U.S. PATENT DOCUMENTS

| | | | | |
|---|---|---|---|---|
| 5,559,347 A | * | 9/1996 | Yamazaki et al. | 257/139 |
| 5,570,060 A | * | 10/1996 | Edwards | 327/541 |
| 6,069,950 A | * | 5/2000 | Knollman | 379/413 |
| 6,525,514 B1 | * | 2/2003 | Balakrishnan et al. | 323/277 |
| 2004/0046533 A1 | * | 3/2004 | Balakrishnan et al. | 323/277 |

OTHER PUBLICATIONS

Data Sheet for MIC2005/2015, "Fixed Current Limit Power Distribution Switch," Micrel, Inc., pp. 1-16, dated Aug. 2005.

* cited by examiner

*Primary Examiner*—Jessica Han
*Assistant Examiner*—Emily Pham
(74) *Attorney, Agent, or Firm*—Patent Law Group LLP; Carmen C. Cook

(57) ABSTRACT

A method for operating a current limit power switch for supplying power to a load include activating the power switch to start supplying power to the load; limiting the current drawn by the power switch to a first current limit for a first, fixed duration; after the first, fixed duration, limiting the current drawn by the power switch to a second current limit for a second duration where the second current limit is less than the first current limit; and after the second duration, limiting the current drawn by the power switch to a third current limit where the third current limit is less than the second current limit.

14 Claims, 3 Drawing Sheets

POWER DISTRIBUTION CURRENT LIMITING SWITCH INCLUDING A CURRENT LIMIT BLANKING PERIOD PROVIDING A BURST OF CURRENT

FIELD OF THE INVENTION

The invention relates to a power distribution switches and a method of operation thereof and, in particular, to a power distribution switches including a blanking period to allow a burst of supply current at device startup.

DESCRIPTION OF THE RELATED ART

Current limit power distribution switches ("power switches") are used in applications where power is provided to an external device. In a typical application, a current limiting power switch is placed between power supply and a load where the power switch functions include power switching and current limiting. The power switching function of the power switches allows power to be supplied to the load when the switches are enabled and cut-off power to the load when the switches are disabled. The amount of current the load can draw is limited by the current limit of the power switches.

Power switches includes current limiting function to limit the supply current to a safe level. Current limiting is particularly important during the initial power up of a load. At startup, certain loads (such as an USB hard drive having a motor) consume higher amount of current as compared to during normal operation. The current limiting function of the power switch limits the surge current to a safe level to avoid destroying the switching devices.

However, in some applications, the current limiting function of the power switches has the undesirable effect of not providing enough currents for power-up or start-up operations of some devices. At power-up, the load may require high bursts of current but the current limiting power switch would current limit immediately in view of the excessive current demand. In that case, the load may not be able to be powered up properly.

It is known to operate a power switch to provide momentary high current surges for a fixed time period before the onset of the current limiting function. This feature is referred to as "Kickstart" which is implemented in a fixed current limit power distribution switch MIC2015, available from Micrel Inc., San Jose, Calif. After the fixed time period, the normal current limiting function is initiated. While the momentary high current helps in the startup operation of most loads, the current surges are still insufficient to allow all devices to start up reliably.

SUMMARY OF THE INVENTION

According to one embodiment of the present invention, a method for operating a current limit power switch for supplying power to a load include activating the power switch to start supplying power to the load; limiting the current drawn by the power switch to a first current limit for a first, fixed duration; after the first, fixed duration, limiting the current drawn by the power switch to a second current limit for a second duration where the second current limit is less than the first current limit; and after the second duration, limiting the current drawn by the power switch to a third current limit where the third current limit is less than the second current limit.

According to another aspect of the present invention, a power switch for supplying power to a load includes a control circuit for setting a first current limit for a first, fixed duration upon activation of the power switch, for setting a second current limit for a second duration after the expiration of the first, fixed duration, the second current limit being less than the first current limit, and for setting a third current limit at the expiration of the second duration, the third current limit being less than the second current limit.

The present invention is better understood upon consideration of the detailed description below and the accompanying drawings.

DETAILED DESCRIPTION OF THE PREFERRED EMBODIMENTS

In accordance with the principles of the present invention, a current limit power distribution switch ("power switch") incorporates a current limit blanking period when the power switch is enabled to provide a high burst of current to the load at the initial power up period. The current limit blanking period has a fixed time duration and permits dynamic loads to draw sufficient energy needed to start-up without sacrificing system safety. In this manner, the power switch of the present invention can handle excessive current demands at power up without shutting down so that consistent and reliable start-up of loads connected to the power switch is ensured.

Figure 1:
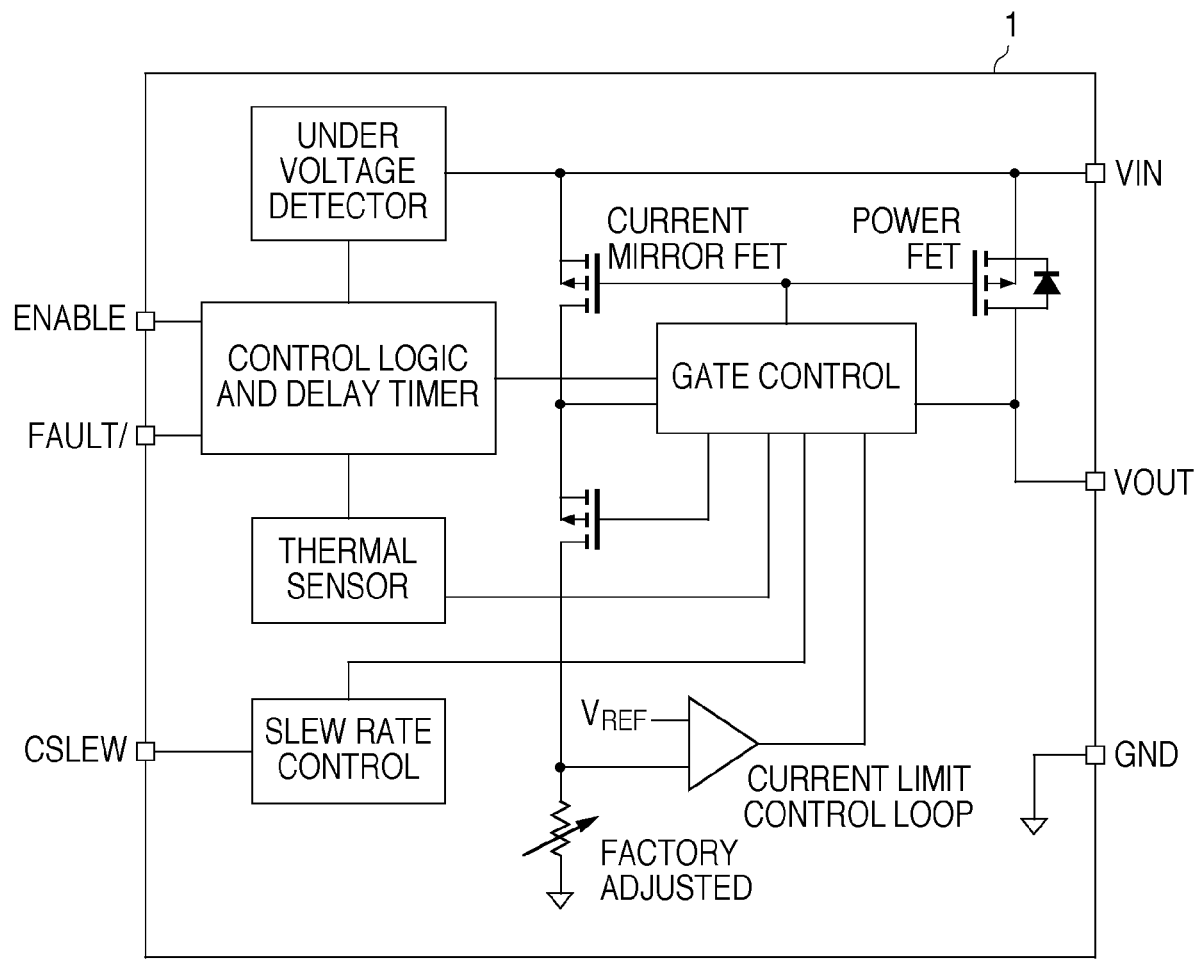
FIG. 1 is a block diagram of a current limit power switch in which the current limit blanking period of the present invention is implemented according to one embodiment of the present invention.
Figure 2:
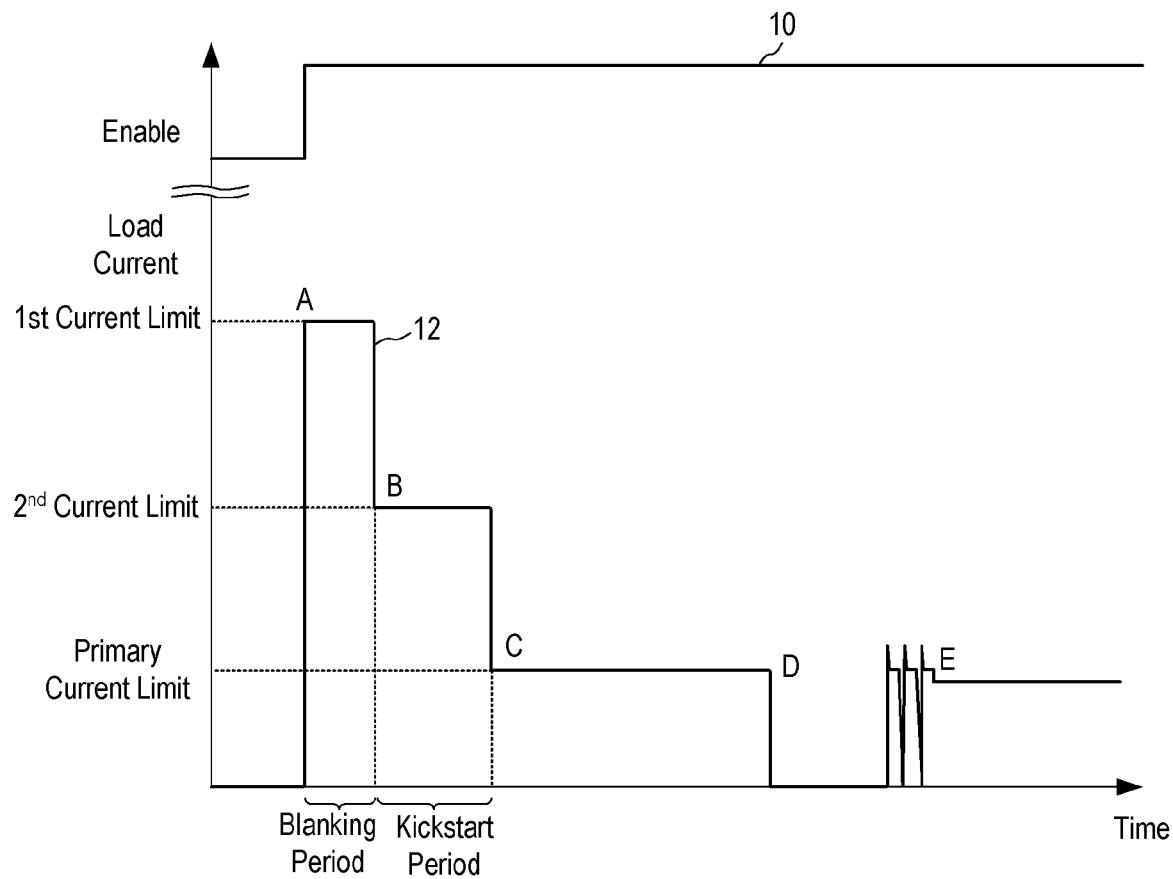
FIG. 2 is a timing diagram illustrating the operation of the current limit blanking period implemented in the current limiting power switch according to one embodiment of the present invention.
Figure 3:
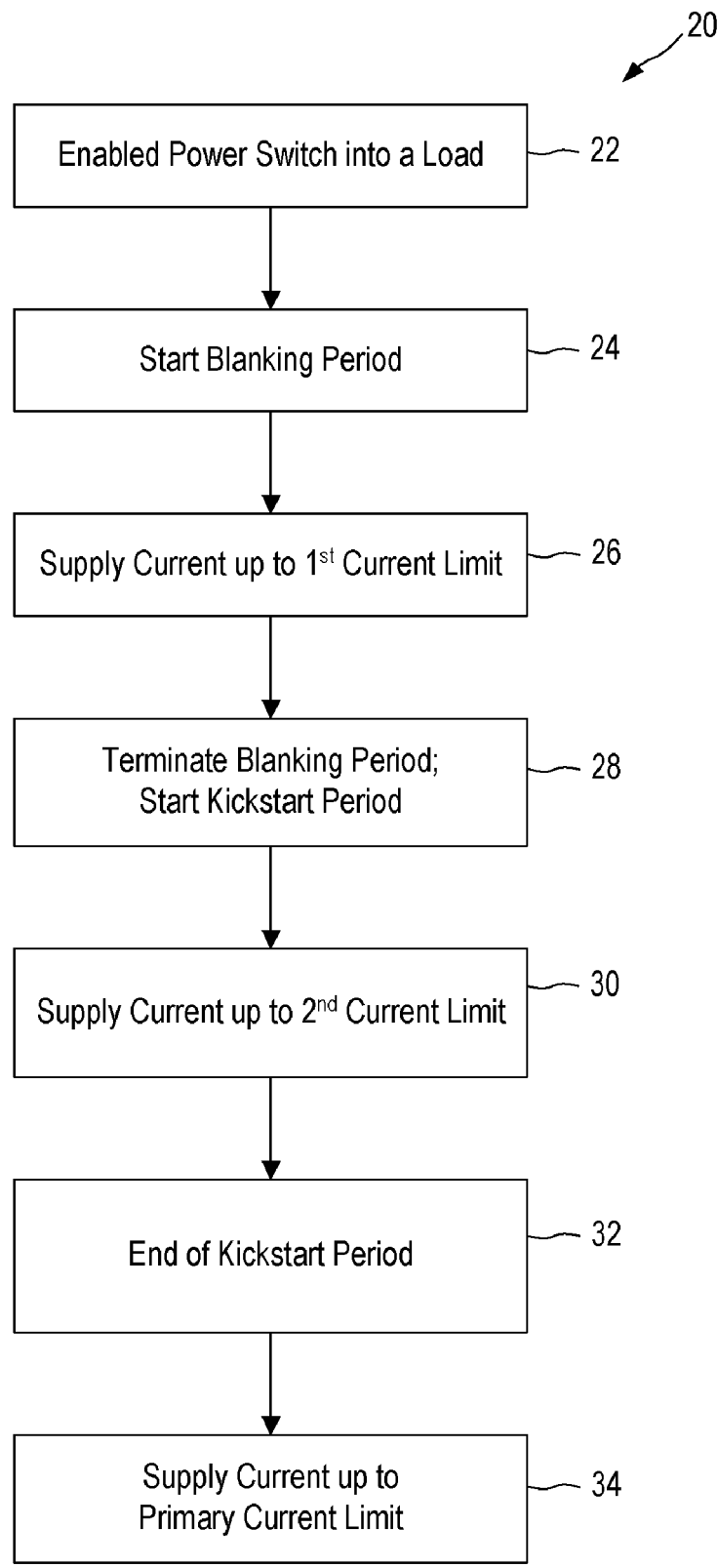
FIG. 3 is a flow chart illustrating the operation of the current limiting power switch incorporating the current limit blanking period according to one embodiment of the present invention.

FIG. 1 is a block diagram of a current limit power switch in which the current limit blanking period of the present invention is implemented according to one embodiment of the present invention. FIG. 2 is a timing diagram illustrating the operation of the current limit blanking period implemented in a current limiting power switch according to one embodiment of the present invention. FIG. 3 is a flow chart illustrating the operation of the current limiting power switch incorporating the current limit blanking period according to one embodiment of the present invention. The operation of a power switch implementing the current limit blanking period of the present invention will be described with reference to FIGS. 1 to 3.

Referring to FIG. 1, a current limit power switch 1 receives an input power on a terminal VIN and provides output power through a terminal VOUT. The power switch 1 operates under the control of an Enable input signal. When the Enable signal is not asserted, the output power FET is deactivated and no power is provided to the output power terminal VOUT. When the Enable signal is asserted, the output power FET is activated and the input power VIN is applied to the output power terminal VOUT. Output power terminal VOUT supplies power to a load connected thereto. Power switch 1 includes other input/output signals, such as a slew rate control input CSLEW and a fault status output FAULT.

In accordance with the principles of the present invention, power switch 1 implements three different current limit levels including a first current limit during an initial blanking period, a second current limit during a kickstart period and a primary current limit for normal operation. The first current limit is greater than the second current limit and the second current limit is greater than the primary current limit. The use of the current limit blanking period at the initial start up of the power switch ensures that sufficient power is supplied momentarily to the load during the power up operation of the load.

FIG. 2 illustrates the assertion of the Enable signal (waveform 10) and the current drawn by the power switch 1 during the operation of the power switch (waveform 12). When the output power FET is enabled, current flows from the input power terminal VIN to the output power terminal VOUT through the power FET. Referring to FIGS. 2 and 3, the Enable signal (waveform 10) is asserted at a time A. The power FET is thus activated to pass the input power VIN to the output power terminal VOUT (step 22). Power switch 1 starts up and begins supplying power to the load. At start-up (time A), power switch 1 enters the current limit blanking period (step 24). The current limit blanking period has a fixed time duration (from time A to time B) and the current drawn by the load is limited to the first current limit (step 26). The first current limit is a high current threshold so that bursts of current can be supplied to the load upon start-up. In this manner, sufficient current is provided to the load to overcome the inertial loads without sacrificing system safety.

The current limit blanking period allows a surge of current to be supplied for a limited time period. Typically, the first current limit is well above the primary and secondary current limits. In one embodiment, the first current limit is set to be the absolute maximum current which the power switch can pass. For example, the first current limit can be set to 5A to 6A in one embodiment. In another embodiment, the first current limit is set to be below the absolute maximum current level. Because the first current limit is of a high current value, the duration of the blanking period is fixed and has a short duration to prevent excessive current leading to thermal shutdown. In one embodiment, the fixed time duration of the blanking period is less than 1 milli-second.

At the expiration of the blanking period (time B), the kickstart period starts (step 28). During the kickstart period, the current limit is set to the second current limit, lower than the first current limit (step 30). The kickstart period is maintained for a time duration from time B to time C which can be fixed or can be adjustable. In one embodiment, the second current limit is set at 4A. Furthermore, the second current limit can be fixed or can be adjustable. The duration of the kickstart period can be between 70 ms to 192 ms.

At the expiration of the kickstart period (step 32), the current limit is then set to the primary current limit (step 34) and the power switch enters normal operation. In one embodiment, the primary current limit is about 2A. If at a future time duration, the primary current limit is exceeded, such as at time D, the power switch will enter thermal shutdown for a given duration followed by thermal cycling. At time E, when the load condition becomes normal, the power switch resumes normal operation with current limit at the primary current level.

By implementing the current limit blanking period at the initial start-up of the load, enough current is supplied to ensure that the load can start up without shutting down the power switch. As a result, the power switch can transition properly from the blanking period to the kickstart period and then to normal operation. In normal operation, power switch 1 may allow another kickstart period to occur if the current demand is high. However, power switch 1 will not allow another current limit blanking period to occur as the current limit blanking period is intended for use at the initial start-up operation only.

The current limit blanking period and the kickstart period can be implemented in a control circuit in power switch 1, such as the control logic and delay timer block in FIG. 1.

The above detailed descriptions are provided to illustrate specific embodiments of the present invention and are not intended to be limiting. Numerous modifications and variations within the scope of the present invention are possible. The present invention is defined by the appended claims.

I claim:

1. A method for operating a current limit power switch for supplying power to a load, comprising:
    activating the power switch to start supplying power to the load;
    limiting the current drawn by the power switch to a first current limit for a first, fixed duration;
    after the first, fixed duration, limiting the current drawn by the power switch to a second current limit for a second duration, the second current limit being less than the first current limit; and
    after the second duration, limiting the current drawn by the power switch to a third current limit, the third current limit being less than the second current limit.

2. The method of claim 1, wherein the first current limit comprises a current level being approximately equal to the maximum current capability of the power switch.

3. The method of claim 1, wherein the first current limit comprises a current level being near but less than the maximum current capability of the power switch.

4. The method of claim 1, wherein the first current limit comprises a current value of 5-6 A, the second current limit comprises a current value of 4 A, and the third current limit comprises a current value of 2 A.

5. The method of claim 1, wherein the first, fixed duration comprises a duration of less than 1 milli-seconds.

6. The method of claim 1, wherein the second current limit and the second duration are both adjustable.

7. The method of claim 1, wherein the second duration comprises a duration between 70 milli-seconds to 192 milli-seconds.

8. A power switch for supplying power to a load, the power switch comprising:
    a control circuit for setting a first current limit for a first, fixed duration upon activation of the power switch, for setting a second current limit for a second duration after the expiration of the first, fixed duration, the second current limit being less than the first current limit, and for setting a third current limit at the expiration of the second duration, the third current limit being less than the second current limit.

9. The power switch of claim 8, wherein the first current limit comprises a current level being approximately equal to the maximum current capability of the power switch.

10. The power switch of claim 8, wherein the first current limit comprises a current level being near but less than the maximum current capability of the power switch.

11. The power switch of claim 8, wherein the first current limit comprises a current value of 5-6 A, the second current limit comprises a current value of 4 A, and the third current limit comprises a current value of 2 A.

12. The power switch of claim 8, wherein the first, fixed duration comprises a duration of less than 1 milli-second.

13. The power switch of claim 8, wherein the second current limit and the second duration are both adjustable.

14. The power switch of claim 8, wherein the second duration comprises a duration between 70 milli-seconds to 192 milli-seconds.

* * * * *